United States Patent
Ochiai et al.

[11] Patent Number: 6,054,933
[45] Date of Patent: *Apr. 25, 2000

[54] PAGER WITH HANDWRITTEN INPUT TRANSMITTED AS AUDIBLE DTMF TONES

[75] Inventors: Kensaku Ochiai, Tokyo; Hirokazu Takagaki, Kanagawa, both of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/884,425

[22] Filed: Jun. 27, 1997

Related U.S. Application Data

[63] Continuation of application No. 08/426,731, Apr. 21, 1995, abandoned.

[30] Foreign Application Priority Data

Apr. 25, 1994 [JP] Japan .................................. 6-108977

[51] Int. Cl.⁷ ...................................................... H04Q 7/14
[52] U.S. Cl. .................. 340/825.44; 340/825.48
[58] Field of Search ........................ 340/825.44, 825.48, 340/825.56, 311.1; 455/31.2, 38.2, 38.4, 38.5; 345/173; 178/18–20, 87; 395/358; 382/313, 315; 380/21

[56] References Cited

U.S. PATENT DOCUMENTS

| | | | |
|---|---|---|---|
| 4,644,352 | 2/1987 | Fujii | 340/825.44 |
| 5,054,051 | 10/1991 | Hoff | 379/56 |
| 5,099,507 | 3/1992 | Mukai et al. | 379/57 |
| 5,257,307 | 10/1993 | Ise | 340/825.44 |
| 5,327,486 | 7/1994 | Wolf et al. | 379/96 |
| 5,335,276 | 8/1994 | Thompson et al. | 380/21 |
| 5,398,115 | 3/1995 | Lin | 455/38.4 X |
| 5,526,411 | 6/1996 | Krieter | 379/110 |

FOREIGN PATENT DOCUMENTS 0426966 5/1991 European Pat. Off. .......... 340/825.44

Primary Examiner—Edwin C. Holloway, III
Attorney, Agent, or Firm—Jay H. Maioli

[57] ABSTRACT

A pager has an input unit, a signal generating unit, a conversion unit, a receiving unit and a display unit. The input unit reads information input by handwriting as image data. The signal generating unit generates a DTMF signal from the image data input by the input unit. The conversion unit converts the DTMF signal from the signal generating unit into a DTMF tone, and outputs it to the transmitter of a telephone apparatus. The receiver unit receives the transmitted signal. The display unit displays display data generated according to image data in the signal received by the receiving unit.

13 Claims, 3 Drawing Sheets

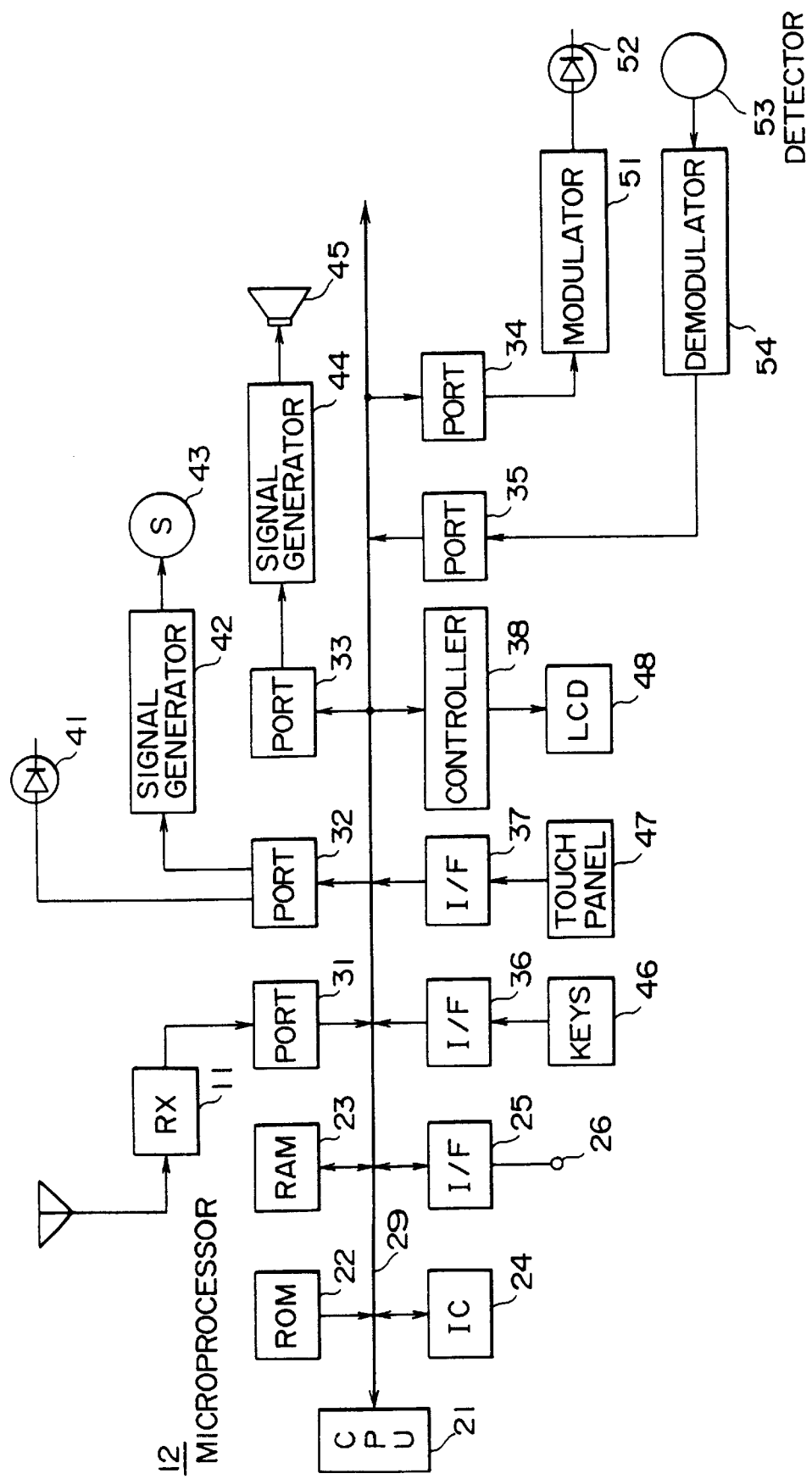

100 SEND ROUTINE

200 RECEIVE ROUTINE

PAGER WITH HANDWRITTEN INPUT TRANSMITTED AS AUDIBLE DTMF TONES

This is a continuation of application Ser. No 08/426,731 filed Apr. 21, 1995 now abandoned.

BACKGROUND

1. Field of the Invention

The present invention relates to a pager. More particularly, the present invention relates to a pager having a handwriting input unit.

2. Background of the Invention

In a pager system, when a caller dials a number which is assigned to the pager, the call is transferred to the pager via an operator (base station). As a result, a person carrying the pager is alerted by a bell or an alarm.

In an IP-type of paging system, the person is not only alerted, but a message can also b e sent to him.

However, when a message is sent to an IP-type of paging system, the message must be inputted by means of digital buttons on the telephone apparatus. As telephone apparatuses have only the dialing buttons [0]–[9], [*] and [#], each character of the message has to be encoded as a number of several digits. This means the sender (caller) must carry a conversion chart of characters and number codes, and input the message while referring to the chart.

This procedure or operation is very troublesome, and it is easy to make mistakes if the wrong numbers are inputted. In order to solve this problem, the entire message can be converted to a numeric code by a personal computer and conversion software, and the result of the conversion transmitted to the operator through a modem. This requires constant access to a personal computer and a modem, and although this presents no problem when sending messages from an office, it is not practical when the sender is away from his office.

SUMMARY OF THE INVENTION

It is therefore an object of the present invention to provide a pager which resolves the above problem.

According to the present invention, there is provided a pager including an input unit, a signal generating unit and a conversion unit. The input unit reads handwritten input information as image data. The signal generating unit generates a DTMF signal from the image data inputted by the input unit. The conversion unit converts the DTMF signal from the signal generating unit to a DTMF tone, and outputs it to a transmitter of a telephone apparatus.

According to the present invention, there is provided a pager including an input unit, a signal generating unit, a conversion unit, a receiving unit and a display unit. The input unit reads handwritten input information as image data. The signal generating unit generates a DTMF signal from the image data inputted by the input unit. The conversion unit converts the DTMF signal from the signal generating unit to a DTMF tone, and outputs it to a transmitter of a telephone apparatus. The receiving unit receives the transmitted signal. The display unit displays display data generated according to the image data in the received signal.

According to this invention, handwritten characters and other information can easily be inputted and transmitted, and the transmitted character information received and displayed, without the use of a character/number conversion table or the like.

BRIEF DESCRIPTION OF THE DRAWINGS

FIG. 1 is block diagram showing the essential parts of a pager according to one embodiment of the invention.

DESCRIPTION OF THE DRAWINGS

Figure 2A:
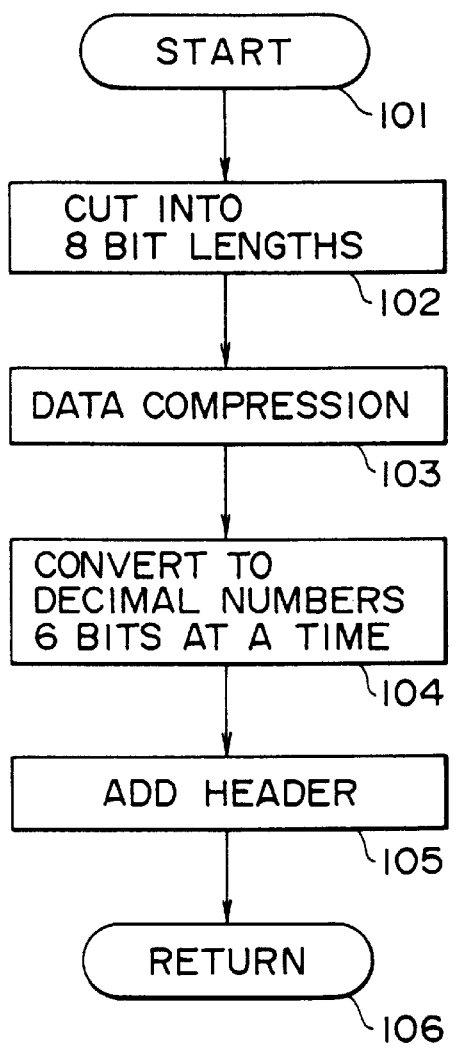
FIGS. 2A and 2B are flowcharts showing examples of processing according to this invention.

Referring to the drawings, a pager according to one embodiment of the invention will now be described in further detail.

FIG. 1 is a block diagram showing the overall arrangement of one example of a pager according to the present invention. A reference numeral 11 denotes a receiving circuit. The receiving circuit 11, which is not shown in detail, is a super heterodyne system that has elements from an antenna input circuit to an FSK (Frequency Shift Keying) demodulator circuit. When a signal is transmitted from a base station to the pager, it is received by the receiving circuit 11, identification codes and other data are extracted from the receiving circuit 11, and these codes and data are then supplied to a decoder circuit.

Figure 2B:
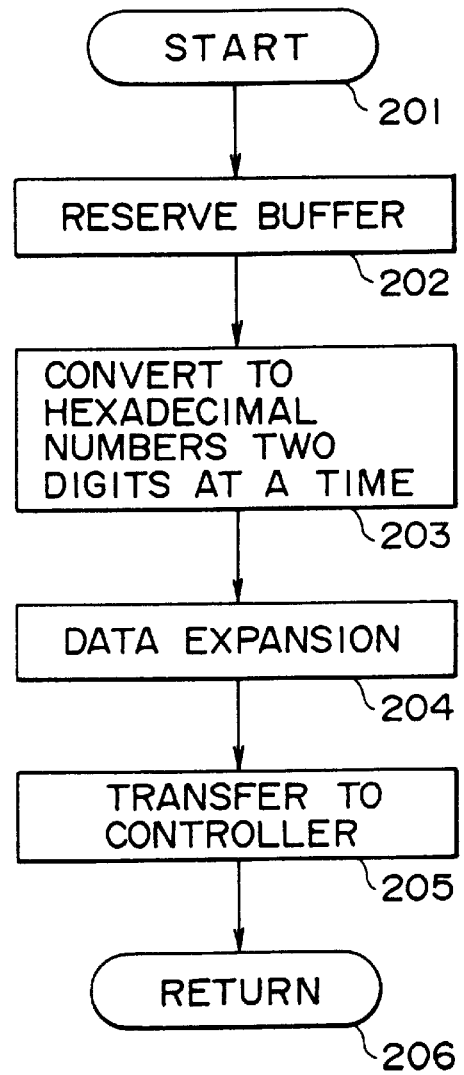

According to this embodiment, this decoder circuit is composed of a microprocessor 12 wherein a reference numeral 21 denotes a CPU, a reference numeral 22 denotes a ROM, and a reference numeral 23 denotes a RAM for providing a work area and storing data. These memories 22 and 23 are connected to the CPU 21 by a system bus 29. The ROM 22 stores various processing programs including a transmitting processing routine 100 and a receiving processing routine 200, for example as shown in FIGS. 2A and 2B, respectively. The ROM 22 also stores an identification code that specifies the pager.

A reference numeral 24 denotes a memory card that can be freely attached to or detached from this pager. A reference numeral 25 indicates an external interface circuit for performing data access with external devices. A reference numeral 26 denotes an external connector for connecting to external devices. The memory card 24 and the external interface circuit 25 are connected to the system bus 29.

The reference numerals 31 to 35 indicate input or output ports, these ports 31 to 35 also being connected to the CPU 21 by the system bus 29. When identification codes and data are outputted by the receiving circuit 11, they are read into the microprocessor 12 through the port 31. An LED 41 connected to the port 32 notifies the carrier by a light when the pager is called.

The output signal from the port 32 is supplied as a control signal to an alarm signal circuit 42, and the output signal from the circuit 42 is supplied to a sound conversion unit (sounder) 43 such as a speaker unit or piezoelectric device. The output signal from the port 33 is supplied as a control signal to a circuit 44 that generates a DTMF signal, and the output signal is then supplied to a speaker 45.

Reference numerals 36 and 37 are interface circuits, and 38 is a display controller, these circuits 36 to 38 also being connected to the system bus 29. Various operating buttons 46 are connected to the interface circuit 36, a touch panel 47 is connected to the circuit 37, and a display 48 composed of a liquid crystal device (LCD) or the like is connected to the controller 38.

In this case, the touch panel 47 includes a transparent electrode having an input surface of identical size to, and formed in a one-piece construction with, the display surface of the display 48. The number of dots for input display may for example be 256 dots (horizontally)×128 dots (vertically). When message information is inputted by a pen, not shown, on the touch panel 47, the position of the pen point is read in dot units, and is displayed in dot units on the display 48 corresponding to the position of the pen point. The display is such that when a message is inputted on the touch panel 47, it is displayed on the display 48 as if the contour traced by the pen were that of a pencil.

The output signal from the port 34 is supplied to a modulating circuit 51 and converted into a predetermined format. The output signal from the modulating circuit 51 is supplied to a light source 52 such as an LED that emits an infrared ray. The infrared ray from this light source 52 is transmitted to another device, not shown. This other device has a phototransistor 53. The infrared ray is detected and photoelectrically converted to a modulated signal by the phototransistor 53. The signal output by the phototransistor 53 is supplied to a demodulating circuit 54 so as to be converted to the original data signal. The signal from the demodulating circuit 54 is supplied to the port 35.

The pager is provided with the display 48 and the touch panel 47 on top of it on one of the main surfaces of the body of the device. A slot for inserting a memory card 24 is provided on a lateral surface of the pager. Also provided on the lateral surface of the pager are the LED 41 for notifying a call, the sound unit 43, and the light source 52 and phototransistor 53 for transmitting and receiving infrared rays. The speaker 45 which is used for sending data is provided on another main surface of the body.

As an example, the size of the pager might be 80 mm (breadth)×120 mm (height)×20 mm (thickness) when a cover protecting the display 48 and touch panel 47 is closed.

According to the aforementioned construction, when a caller calls via the telephone apparatus, an FSK signal containing an identification code is transmitted by the base station, and an identification code is outputted by the receiving circuit 11.

The identification code outputted by the receiving circuit 11 is compared by the CPU 21 with an identification code stored in the ROM 22. When the identification code from the receiving circuit 11 and the identification code stored in the ROM 22 are identical, the LED 41 is turned on the light by a control signal from the CPU 21 to alert the carrier of the pager that there has been a call. At the same time, the circuit 42 is authorized to generate a signal to drive the sound conversion unit 43, and a drive signal from the circuit 42 is supplied to the unit 43. The carrier is therefore alerted also by a call issued by the sound conversion unit 43.

When the caller wants to transmit a message to the carrier, he writes it with a pen on the touch panel 47.

Next, when a predetermined button on the operating panel 46 is pressed, processing by the CPU 21 starts from a step 101 of a routine 100, then in a step 102, this information is read into the RAM 23 as image data which is displayed by the display 48. In this process, the information displayed by the display 48 may be converted to data for example by coding black as "1" and white as "0". The data is read in portions of 8 dots at a time, starting from the dot at the upper left of the screen of the display 48.

When the image data displayed by the display 48 has been completely read into the RAM 23, the routine advances from the step 102 to a step 103. In the step 103, the image data which has been read into the RAM 23 is compressed by MH compression or a similar compression technique. In a subsequent step 104, the compressed data from the step 103 is cut from the beginning into lengths of 6 bits, and each group of 6 bits is converted into a decimal number of two digits.

After converting the 6 bit data into decimals, the results of the conversion are numbers in the range [00]–[63], which can be expressed by the numbers [0]–[9] on the dial. If the end data is not as long as 6 bits, "0"s are added to generate 6 bits.

Figure 3:
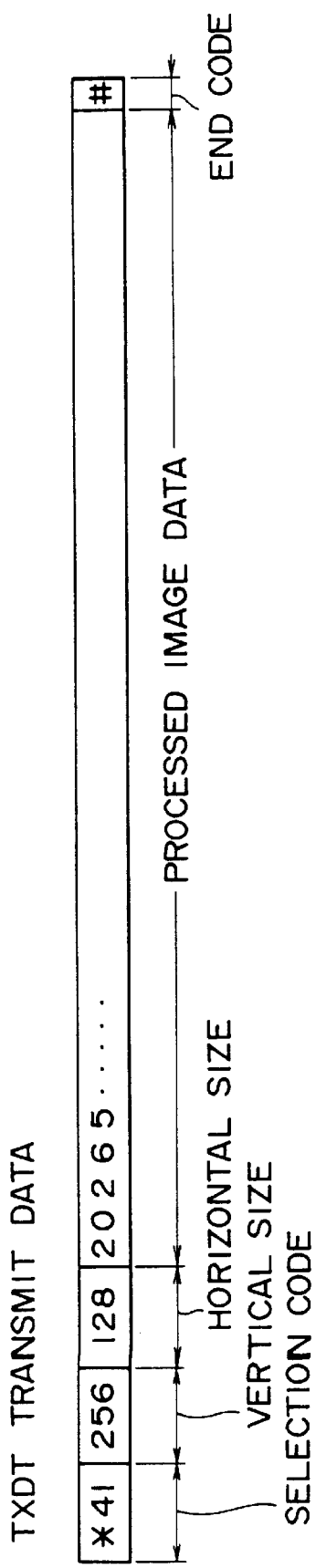
FIG. 3 is a diagram showing a typical format when a signal is transmitted or received.

Next, in a step 105, a predetermined header is added to the result from the step 104 as shown in FIG. 3 so as to generate a transmit data TXDT. In other words, this transmit data TXDT contains data representing for example the dial buttons [*], [4], [1] as a selection code indicating that the data after the header is image data and that it is to be transmitted. The following data in the transmit data TXDT are the 3 digit numbers [256], [128] indicating the dot size in the vertical and horizontal directions of this image data. After this size data, there is a string of decimal data (image data) converted in the step 104, and finally data representing the dial button [#] as an end code. The aforementioned process of compressing image data, the process of converting 6 bits of data into a two digit decimal number and the process of generating transmit data are performed by the CPU 21 or by various circuits, not shown, in the microprocessor 12. When the transmit data TXTD has been generated, the routine 100 is terminated in a step 106.

When the image data that was handwritten on the touch panel 47 and displayed on the display 48 has been converted into the transmit data TXDT by the routine 100, it is ready to be actually transmitted.

The speaker 45 is brought close to the telephone apparatus, not shown, and the carrier's call number is inputted from the dial buttons on the control panel 46. The signal generating circuit 44 is controlled so as to generate a DTMF signal according to the input call number which is supplied to the speaker 45. The DTMF tone of the carrier's call number is supplied from the speaker 45 to the transmitter or the microphone of the telephone apparatus, and a corresponding DTMF signal is transmitted to a telephone line.

After connection to the base station, a button for transmitting image data, which is one of the operating buttons 46, is pressed or operated. The transmit data TXTD processed by the routine 100 shown in FIG. 2A is then supplied to the signal generating circuit 44, and a DTMF signal corresponding to the transmit data TXDT is outputted by the signal generating circuit 44. The transmit data TXDT processed by the routine 100 is therefore outputted as a DTMF tone from the speaker 45, and this DTMF signal is transmitted to the telephone line.

When all transmit data TXDT according to the DTMF signals have been outputted, transmission of the transmit data TXDT is terminated. When the base station receives the call number and transmit data TXDT, it performs predetermined processing on the received signals, converts the identification code of the carrier's pager and the transmit data TXDT to an FSK signal, and then transmits this FSK signal.

When the carrier's pager receives this FSK signal, the carrier is notified by the turning on the light of the LED 41 and by a call tone from the sound unit 43 as described here in before.

In this case, the transmit data TXDT was received together with the identification code. From the data [*41] transmitted together with the identification code, the microprocessor 12 regards the transmitted data as image data TXDT, and the routine 200 shown in FIG. 2B is executed in order to receive this transmit data TXDT.

When the data [*41] is received, processing by the CPU 21 begins in a step 201 of the routine 200, and in a step 202, vertical size and horizontal size data of the transmit data TXDT are extracted from the received data. A buffer area corresponding to this transmit data TXDT is reserved in the RAM 23, and the transmit data TXDT is then written in this area.

When all the transmit data TXDT has been received, the routine advances to a step 203. In this step 203, the received transmit data TXDT is converted, two digits at a time, to hexadecimal numbers each of 6 bits length. Then, in a step 204, the transmit data TXDT converted into hexadecimal numbers is expanded to give the original transmit data.

This expanded transmit data TXDT is converted into display data in a step 205, and supplied to the display controller 38. The routine 200 is then terminated in a step 206. Processing of the routine 200 shown in FIG. 2B is performed by the CPU 21, or by various circuits in the microprocessor 12.

The display controller 38 displays data on the display 48 according to the data supplied. This data is image data based on the received transmit data TXDT, i.e. characters handwritten by the called party are displayed in the form of an image.

Hence, according to this pager, characters inputted by handwriting can be transmitted, and handwritten input characters can be received and displayed.

Hereinabove, the case was described where the transmit data TXDT is converted to a DTMF signal, and sent to the other party's pager via a base station. In the pager according to this embodiment, it is also possible to press another send button of the operating buttons 46 so that the transmit data TXDT is converted by an infrared ray before transmission.

In this case, the sending and receiving pagers are arranged facing each other with a suitable distance between them, and the send button of the sending pager is pressed. The transmit data TXDT processed by the routine 100 in FIG. 2A is then supplied to a modulating circuit 51. From the modulation circuit 51, an FSK modulated signal or FM modulated signal is outputted by this transmit data TXDT, and this modulated signal is supplied to a light source 52 such as an LED that emits an infrared ray. An infrared ray whose light intensity or the output power level is modulated by the modulated signal from the modulating circuit 51, is therefore outputted by the light source 52.

The infrared ray from the light source 52 is detected by a phototransistor 53 in the receiving pager, and the original modulated signal is extracted. The modulated signal outputted by the phototransistor 53 is supplied to a demodulating circuit 54, and demodulated to the original transmit data TXDT. Subsequently, the demodulated transmit data TXDT is processed by the routine 200 shown in FIG. 2B as described here in before. Characters that have been transmitted by the infrared ray are thereby displayed as an image on the display 48 of the receiving pager.

In this way, the transmit data TXDT can be transmitted and received by an infrared ray when two pagers are simultaneously available.

In the aforesaid description, the aforementioned processing was performed when predetermined buttons on the control panel 46 were pressed. It is however possible to display icons on the display 48, and to perform the corresponding processing by pressing the icons.

To detect the pen on the touch panel 47, a pressure detection method or electrostatic method may also be used. Further, a different method from MH compression may be used for data compression in the step 103, and the signal format of the transmit data TXDT or the method used to transmit it are not limited to the above.

Further, in the aforesaid description, dialing was performed after executing the routine 100 shown in FIG. 2A, but if processing by the CPU 21 is sufficiently fast, after dialing, the original image data can be transmitted to the telephone line as it is converted to the transmit data TXDT. Similarly, at the receiver, the original image data can be displayed as the transmit data TXDT is received and converted.

What is claimed is:

1. A pager comprising:

input means for reading handwritten input information including a message body as image data, the input means including display means for displaying the handwritten input information;

DTMF tone signal generating means for generating DTMF tone signals from the image data input using the input means;

conversion means for converting the DTMF tone signals from the DTMF tone signal generating means to audible DTMF tones and outputting the audible DTMF tones to a transmitter of a telephone apparatus;

external interface means connected to the conversion means and the input means via a bus for exchanging data with an external device; and means for receiving a detachable memory card connected to the external interface means via the bus, wherein the image data includes vertical and horizontal data corresponding to dimensions of the image data, and the image data is transmitted as audible DTMF tones.

2. A pager according to claim 1, wherein the input means further includes a touch panel provided on the display means, wherein data input using the touch panel is read by the DTMF tone signal generating means as the image data.

3. A pager according to claim 1, further comprising means for receiving DTMF tones transmitted from a base station to the pager, whereby image data contained in the DTMF tones received by the means for receiving is converted into display data for display on the display means.

4. A pager according to claim 1, further comprising data conversion means for compressing the image data input using the input means, converting the compressed image data into decimal data, and supplying the decimal data to the DTMF tone signal generating means.

5. A pager according to claim 1, further comprising photoelectric converting means for photoelectrically converting the image data input by the input means into light and transmitting the light.

6. A pager according to claim 5, wherein the photoelectric converting means includes infrared ray conversion means for converting data output by the input means to an infrared ray.

7. A pager according to claim 5, further comprising photodetecting means for receiving photoelectrically converted and transmitted data.

8. A pager comprising:

input means for reading handwritten input information including a message body as image data;

DTMF tone signal generating means for generating DTMF tone signals from the image data input using the input means;

conversion means for converting the DTMF tone signals from the DTMF tone signal generating means to audible DTMF tones and outputting the audible DTMF tones to a transmitter of a telephone apparatus;

receiving means for receiving DTMF tones transmitted from a base station to the pager;

external interference means connected to the conversion means via a bus for exchanging data with an external device;

means for receiving a detachable memory card connected to the external interface means via the bus; and display means for displaying an image generated according to the image data contained in the DTMF tones received by the receiving means, wherein the image data includes vertical and horizontal data corresponding to dimensions of the image data.

9. A pager according to claim 8, wherein the input means includes a touch panel provided on the display means, whereby the input means reads the input data input from the touch panel as the image data.

10. A pager according to claim 8, further comprising data conversion means for compressing the image data input using the input means, converting the compressed image data into decimal data, and supplying the decimal data to the DTMF tone signal generating means.

11. A pager according to claim 8, further comprising photoelectric converting means for photoelectrically converting the image data input using the input means into light and transmitting the light.

12. A pager according to claim 11, wherein the photoelectric converting means includes infrared ray conversion means for converting data output by the input means to an infrared ray.

13. A pager according to claim 12, further comprising photodetecting means for receiving photoelectrically converted and transmitted data.

* * * * *